United States Patent
Yalniz et al.

(10) Patent No.: US 9,984,728 B2
(45) Date of Patent: May 29, 2018

(54) VIDEO CONTENT ALIGNMENT

(71) Applicant: A9.com, Inc., Palo Alto, CA (US)

(72) Inventors: Ismet Zeki Yalniz, Mountain View, CA (US); Adam Carlson, Seattle, WA (US); Douglas Ryan Gray, Redwood City, CA (US); Colin Jon Taylor, Orinda, CA (US)

(73) Assignee: A9.COM, INC., Palo Alto, CA (US)

( * ) Notice: Subject to any disclaimer, the term of this patent is extended or adjusted under 35 U.S.C. 154(b) by 309 days.

(21) Appl. No.: 14/997,351

(22) Filed: Jan. 15, 2016

(65) Prior Publication Data

US 2016/0133299 A1    May 12, 2016

Related U.S. Application Data

(63) Continuation of application No. 14/498,818, filed on Sep. 26, 2014, now Pat. No. 9,275,682.

(51) Int. Cl.
*G11B 27/30* (2006.01)
*G11B 27/036* (2006.01)
*G11B 27/34* (2006.01)
*G11B 27/031* (2006.01)
*G11B 27/10* (2006.01)

(52) U.S. Cl.
CPC ........ *G11B 27/3072* (2013.01); *G11B 27/031* (2013.01); *G11B 27/036* (2013.01); *G11B 27/10* (2013.01); *G11B 27/3081* (2013.01); *G11B 27/34* (2013.01)

(58) Field of Classification Search
CPC . G11B 27/3072; G11B 27/031; G11B 27/036; G11B 27/10; G11B 27/3081; G11B 27/34
See application file for complete search history.

(56) References Cited

U.S. PATENT DOCUMENTS 8,686,271 B2 * 4/2014 Wang ................ G06F 17/30861 700/94
8,718,404 B2 * 5/2014 Chupeau ............ G06K 9/00711 382/100

(Continued)

OTHER PUBLICATIONS

"Notice of Allowance dated Nov. 5, 2015" received in U.S. Appl. No. 14/498.

*Primary Examiner* — Mishawn Hunter
(74) *Attorney, Agent, or Firm* — Hogan Lovells US LLP (57) ABSTRACT

Various embodiments identify differences between frame sequences of a video. For example, to determine a difference between two versions of a video, a fingerprint of each frame of the two versions is generated. From the fingerprints, a run-length encoded representation of each version is generated. The fingerprints which appear only once (i.e., unique fingerprints) in the entire video are identified from each version and compared to identify matching unique fingerprints across versions. The matching unique fingerprints are sorted and filtered to determine split points, which are used to align the two versions of the video. Accordingly, each version is segmented into smaller frame sequences using the split points. Once segmented, the individual frames of each segment are aligned across versions using a dynamic programming algorithm. After aligning the segments at a frame level, the segments are reassembled to generate a global alignment output.

18 Claims, 10 Drawing Sheets

(56) References Cited

U.S. PATENT DOCUMENTS

| | | | |
|---|---|---|---|
| 9,275,141 B2 * | 3/2016 | Wang | G06F 17/30861 |
| 9,773,058 B2 * | 9/2017 | Wang | G06F 17/30778 |
| 2004/0240725 A1 | 12/2004 | Xu | |
| 2008/0159614 A1 | 7/2008 | He | |

* cited by examiner

$$S(h_i, h_j) = (1 - d(h_i, h_j) / L) - \beta$$

where $d(h_i, h_j)$ is the Hamming distance, $L$ is the Hash code length, $(1 - d(h_i, h_j)/L)$ is the Hash similarity term, and $\beta$ is the Bias term.

VIDEO CONTENT ALIGNMENT

CROSS-REFERENCES TO RELATED APPLICATIONS

This application is a continuation of U.S. application Ser. No. 14/498,818, entitled "VIDEO CONTENT ALIGNMENT," filed Sep. 26, 2014; which is incorporated herein by reference for all purposes.

BACKGROUND

There are many applications in which it is desirable to associate data with a specific timepoint in a video. For example, closed captioning associates data for text with timepoints for when words corresponding to the text are spoken in a video, video bookmarking associates data for a location in the video with a timepoint of the video for later reference, advertisement insertion associates advertisement content with a timepoint in a video corresponding to a desired location for the advertisement to be displayed, video annotation associates metadata, a note, additional information or content, and the like with a timepoint in a video where a respective annotation is relevant or appropriate, among others. In each of these examples, it is important that the respective data item is associated with the correct timepoint. Once this data is associated with respective timepoints in a video, it can further be desirable to propagate this data to other versions of the video. Since other versions of the video often contain additional or deleted content (e.g., new or deleted scenes, advertisements, etc.), the timepoints between a first version of the video might not match the timepoints of a second version of the video.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to identifying differences between frame sequences of a video. In particular, various approaches provide a method for aligning and synchronizing different versions of the same video. For example, to determine a difference between two versions of a video, such as a regular edition and a special edition of a movie, for example, a fingerprint (e.g., visual signature) of each frame of a first version and a second version of a video can be generated. From the fingerprint values, a run-length encoded representation of each version is generated. Unique fingerprint values (e.g., frames from a scene of a movie that only appears once) from each version are identified, where a unique fingerprint is defined as having a fingerprint value that appears only once in the run-length encoded representation of the entire video. The unique fingerprints of the first version are compared to the unique fingerprints of the second version to identify matching unique fingerprints. The matching unique fingerprints are sorted and filtered using a Longest Common Subsequences (LCS) algorithm to determine candidate split points, which are used to align the two versions of the video. Accordingly, each version is segmented into smaller frame sequences using the split points. Once broken down into smaller sequences, the individual frames of each segment from the first version are aligned with the frames of the second version using a dynamic programming algorithm. After aligning the segments on a frame level, the segments of each version can be reassembled to generate a global alignment output.

Accordingly, the global alignment output can provide a frame level detailed alignment between the two versions of the video that can be used to detect copyright violations, identify repeated scenes (e.g., introductions, end-credits, etc.), determine whether two videos are duplicates, generally determine the differences across different versions, and the like. Further, in order to enable a user to access information (e.g., actor or scene information, etc.) while they are currently viewing a film, as discussed above, each scene where this information is available must be annotated with an instruction that, when selected, causes the information to be displayed. As mentioned above, this requires the individual marking, labeling, or addition comments to each frame. Previously, annotations could only be automatically propagated to other versions of the same movie if the other versions have identical content and total duration. Thus, someone would have to individually reenter the annotations for each version containing additions, such a new scenes, an additional trailer or FBI warning, or the like. Since the global alignment is capable of providing frame level alignment details between different version, however, corresponding frames from a first version to a second version can be identified whether they are a single frame apart or 10,000 frames apart, for example. Thus, upon obtaining a set of annotations for a set of frames of a first version of a video, their corresponding frames in a second version of the video can be identified, and the annotations can be automatically propagated to only those correctly matching frames. Accordingly, closed captions, video bookmarks, and advertisements, among others, can also be automatically propagated using the global alignment information.

Various other functions and advantages are described and suggested below as may be provided in accordance with the various embodiments.

Figure 1A:
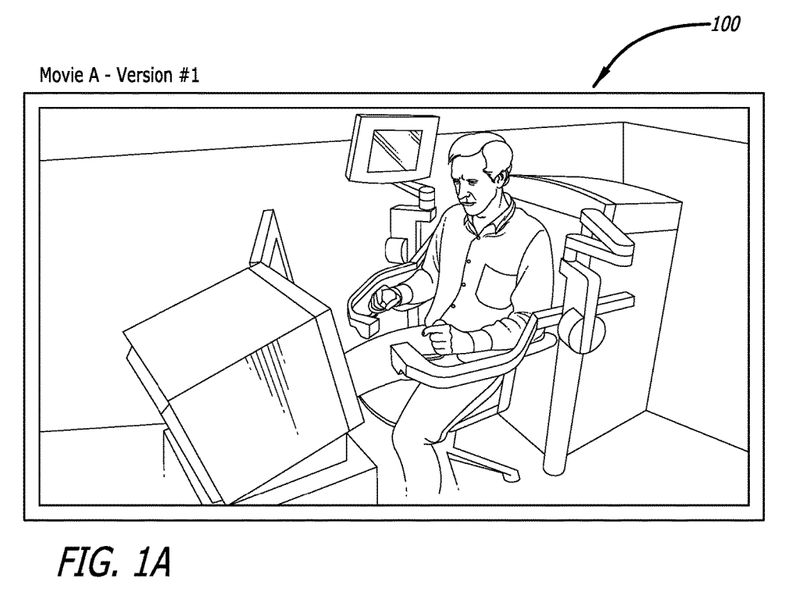
FIG. 1A illustrates a frame from a first version of a movie in accordance with at least one embodiment.
Figure 1B:
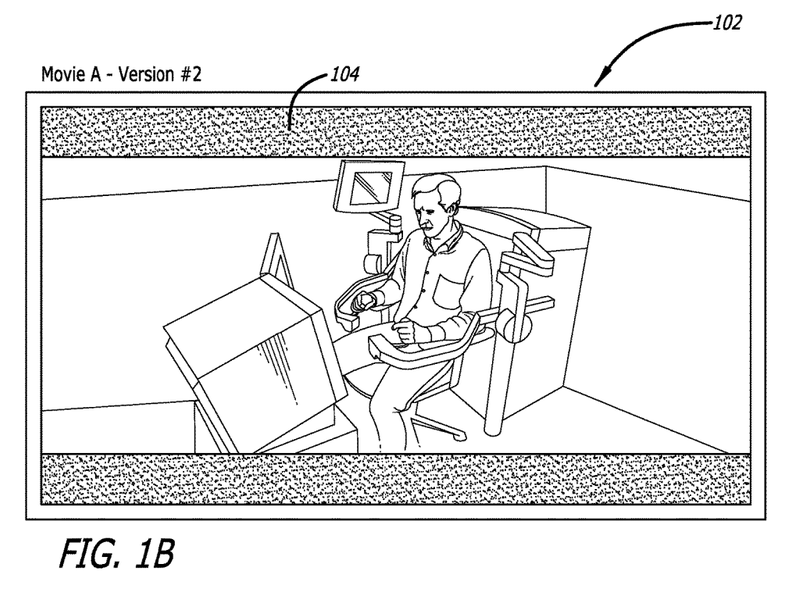
FIG. 1B illustrates the corresponding frame from a second version of the movie illustrated in FIG. 1A in accordance with at least one embodiment.

FIG. 1A illustrates a shot or frame from first version 100 (Version #1) of Movie A and FIG. 1B illustrates the corresponding shot from second version 102 (Version #2) of the Movie A in accordance with at least one embodiment. There are many different versions of the same movie available for users to watch. For example, since second version 102 is a widescreen version that includes letterbox 104, it could be a theatrical version or the version that was originally shown in theaters. There are extended, uncut, or directors cut versions which can include scenes that were filmed, but cut out of the theatrical version, for example. In this example, first version 100 could be one of these versions, which often contains extra scenes as a way to entice people who saw the movie in the theaters to purchase the movie on DVD. Accordingly, frames or whole scenes are often deleted because they slow the pace of a film, are redundant, or are omitted from the theatrical version to preserve the film's rating in the theatres, for example, scenes and additional frames which the extended version often contains. Additionally, the director's cut can sometimes be a vision for the film that the director had which was different than what the studio desired. Accordingly, the director's cut may leave out, add, or reorder scenes relative to the theatrical version, for example. There are also special editions or remastered versions of a film which are typically a version of an older film created using newer technologies to enhance picture, sound quality, or to improve special effects, for example. As a result of the variations between these version, each of them often contains either a different frame ordering or a different number of at least a portion of the individual frames and it can be advantageous to be able to identify the corresponding frames between first version 100 and second version 102. Additionally, it can be advantageous to be able identify repeated in a single video or scenes that are the same across different videos (e.g., opening credits of a television show, etc.).

First, in this example, a fingerprint representing the visual content of each frame of first version 100 and second version 102 is generated. In one example, the fingerprint is a hash-code, such as a 32-bit number, or the link, which can be used to match visually similar frames across these different versions. In order to be effective across various different versions, the fingerprints need to be invariant to visual formatting differences, such as different resolutions, aspect ratios (e.g., 4:3 vs 16:9 etc.), letterbox sizes, color formats, and the like. In one example, each frame is segmented into cells by positioning a rectangular canonical window or patch relative to a center of a respective frame.

Figure 2A:
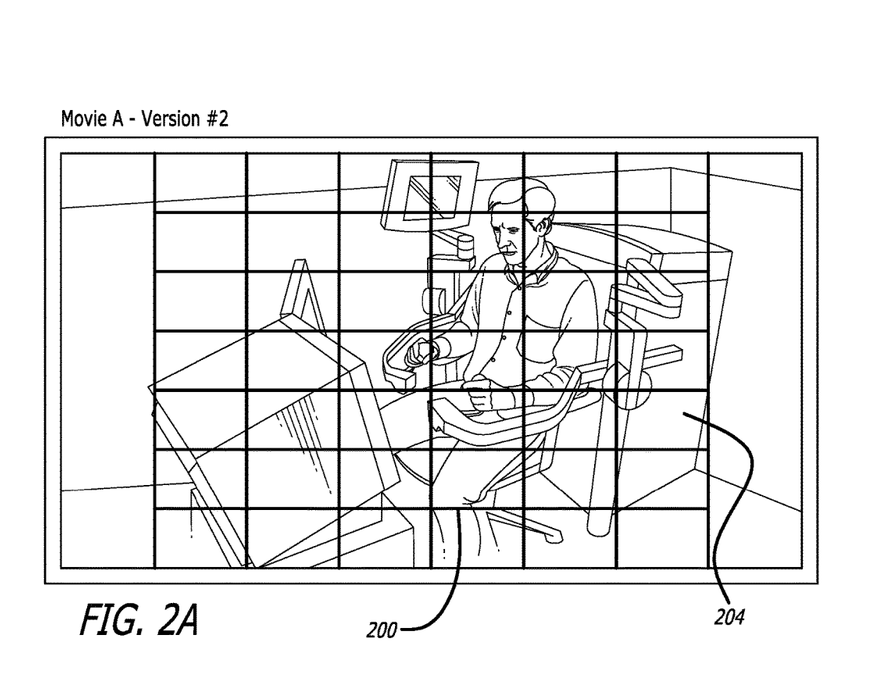
FIG. 2A illustrates an example representation of a canonical patch positioned on the first version of the movie illustrated in FIG. 1A in accordance with at least one embodiment.
Figure 2B:
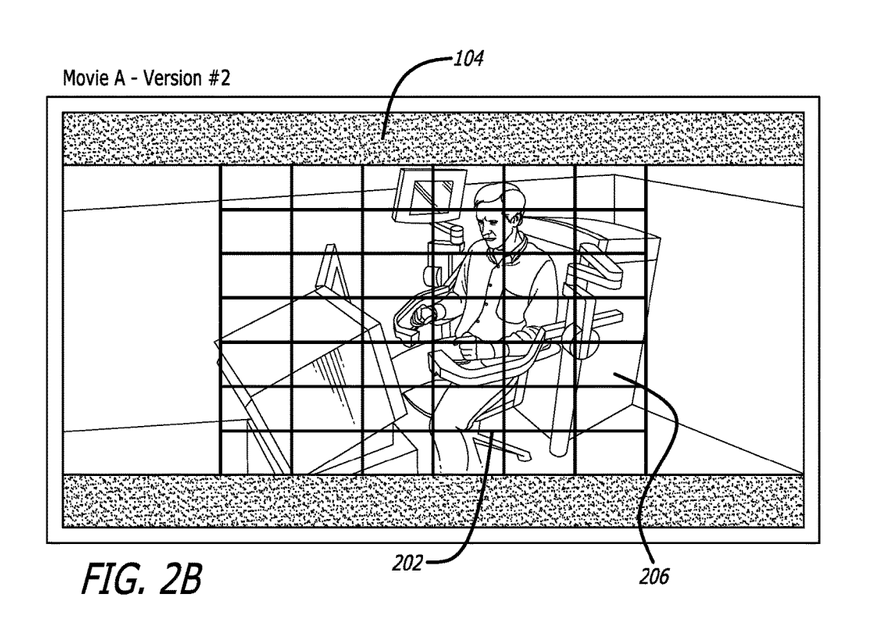
FIG. 2B illustrates a corresponding example representation of the canonical patch positioned on the second version of the movie illustrated in FIG. 1B in accordance with at least one embodiment.

FIG. 2A illustrates an example representation of canonical patch 200 positioned on first version 100 of Movie A and FIG. 2B illustrates a corresponding example representation of canonical patch 202 positioned on second version 102 in accordance with at least one embodiment. Since the frame of second version 102 shown in FIGS. 1B and 2B, as a whole, is not visually similar relative to first version 100, as a result of letterbox 104, the values of their corresponding fingerprints will be different, thereby, preventing proper matching between versions. First version 100 and second version 102, however, are different versions of the same movie, Movie A, in this example, therefore, their fingerprints should match. In an attempt to only make use of visually similar portions of a frame between versions, the canonical patch is positioned in the center of each frame to cover only a portion (or subset, subarea, etc.) of each frame. This, for example, ensures that canonical patch 202 does not cover any portion of letterbox 104 and is, thus, removed from consideration, in this example.

Although the aspect ratio is fixed at 4:3 to comply with TV standards, the height of canonical patch (200, 202) is determined by the height of the frame envelope. In order to ensure proper alignment, frame envelope detection is performed by randomly choosing a number of frames of the video. For each randomly chosen frame, gray level intensity values of pixels along each row are averaged. The average intensity value for each row is expected to stay more or less constant across different frames if it is not part of the actual movie (i.e., part of letterbox 104). The rows of pixels at the top and the bottom of the movie are automatically determined and used to set the height of the canonical patch.

The canonical patch (200, 202) is divided into a number of cells (204, 206) that segment each frame. The number of cells can vary, however, in order to balance time and computational efficiency with matching efficiency, 30 cells (6 horizontal and 5 vertical) has empirically shown to be optimal. Any less cells, matching becomes less precise, any more cells, and the time and computing resources required to synchronize two versions of a video increases. Accordingly, the cells of these canonical patches (200, 202) are used to generate the fingerprints for each frame, as discussed with respect to FIG. 3.

Figure 3:
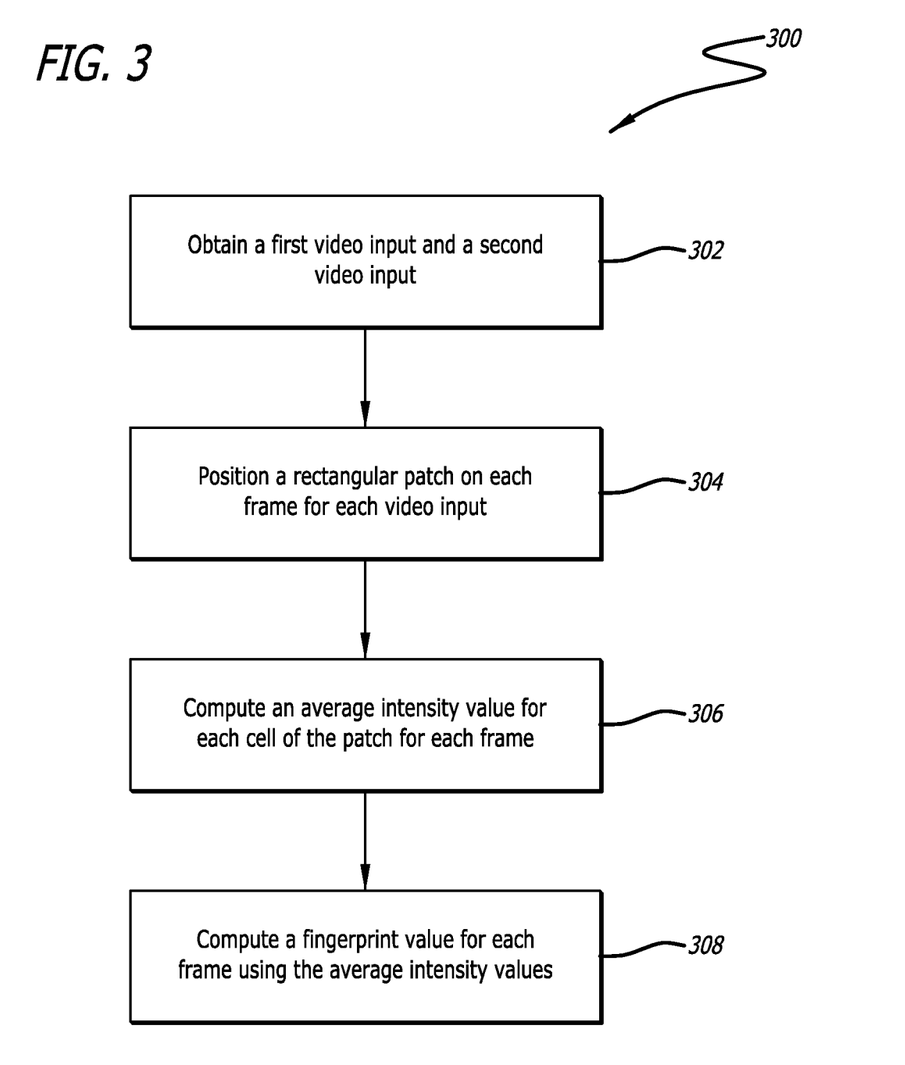
FIG. 3 illustrates an example process for generating a fingerprint of a frame of video that can be used in accordance with at least one embodiment.

FIG. 3 illustrates an example process 300 for generating a fingerprint of a frame of video that can be used in accordance with at least one embodiment. It should be understood that, for this and other processes discussed herein, there can be additional, fewer, or alternative steps, performed in similar or alternative steps, or in parallel, within the scope of the various embodiments unless otherwise stated. As discussed above, a first video input and a second video input are obtained for synchronization 302. In this example, the video inputs could be different versions of the same video, such as different cuts of a film, different episodes of the same television show to identify repeated scenes, or the like. In order to generate a fingerprint, each frame is segmented into a number of cells, as described above, by positioning a rectangular canonical patch (200, 202) on each frame 304. In order to ensure that only visually similar content between, for example, different version is considered, the canonical patch covers an area smaller than the frame itself (in both height and width), as shown in FIGS. 2A-2B, and is positioned at the center of each frame.

Accordingly, in order to generate the fingerprint for a frame, the average intensity value of each cell of the canonical patch is computed 306. In one example, it is the average gray level color intensity value that is computed. The fingerprint value is computed from the intensity values of the cells 308. In one example, the fingerprint is computed by pair-wise comparing the average intensity values against each other to generate a 32-bit fingerprint value. For this purpose, 32 random pairs of cells can be selected and these random pairs can be kept constant for each video and frame.

For example, in order to compute the fingerprint value, the $i^{th}$ bit location of a fingerprint for a given frame can be set to 1 if $A_k > A_m$, otherwise 0, where k and m are indices of the randomly selected pair of cells of the canonical patch and A is the average intensity value. Alternative methods of describing unique features of a frame, such as by calculating feature vectors, other descriptors, or the like can also be used as well within the scope of the various embodiments.

Accordingly, once the fingerprint values for each frame are computed, a run-length encoded representation of the fingerprints to identify unique fingerprints that can be matched between versions or video inputs. A run-length encoding, as discussed herein, is a form of data compression in which runs of data (i.e., sequences in which the same data value occurs in consecutive data elements), in this case the fingerprint values, are stored as a single data value and count, rather than as the original run. Since a video synchronization method must aligning hundreds of thousands of sequences, many alignment techniques are not scalable and run into $O(n^2)$ time complexity issues. Run-length encoding is not only useful for improving time efficiency, but also provides a mapping of each fingerprint occurrence and its duration. These unique fingerprints which appear only once in the run-length coded representation later referred to herein as split points) are used to split the full video into smaller pieces that are more computationally manageable.

Figure 4:
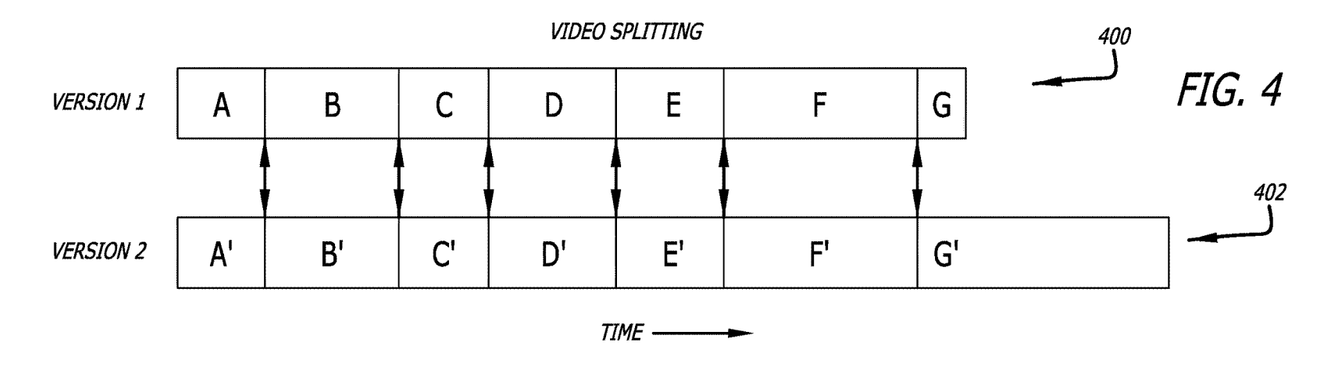
FIG. 4 illustrates an example split point alignment in accordance with at least one embodiment.

FIG. 4 illustrates an example run-length encoded representation of the fingerprints in accordance with at least one embodiment. In this example, A-G each represent a different scene of version 1 400 and each arrow represents a split point. Similarly, A'-G' each represent a different scene of version 2 402 and each arrow represents a split point. The fingerprint values of A-G and A'-G' may appear as follows: 1, 1, 1, 1, 1, 1, 1, 6, 6, 6, 4, 4, 4, 4, 4, 4, 5, 5, 5, 4, 4, 4, 4, 4, 4, 3, 3, 3, 3, 1, 1, 1, 1, 1, 1, 1, 1, which can be represented with a list of pairs [fingerprint value, frequency]: A=[1,8], candidate split point=[6,3], B=[4,6], candidate split point=[5,3], C=[4,6], candidate split point=[3,4], and D=[1, 8]. Depending on the level of granularity used to generate the fingerprints, frames where the scene captured in the video remains constant can have the same or similar fingerprint values even though, for example, a person may be moving from frame to frame. This is because the average background color remains substantially constant and is why there are repeated fingerprint values. At this stage of the process, this level of granularity is acceptable since the fingerprints are generated to identify the split points. Accordingly, fingerprint values that appear only once in the run-length encoded representation are identified. In one example, only unique fingerprints containing at least three consecutive frames (3/24=0.125 sec) are chosen as candidate split points. Thus, in this example, [6,3], [5,3] and [3,4] would be identified as candidate split points. Accordingly, candidate split points are identified for both versions and forwarded to the split point selection stage where multiple heuristic filters are applied on the candidate split points to ensure their suitability. For example, a two hour long video has typically N=24×60×120=172,800 number of frames. A bit vector of size 32 (4 bytes per frame) that enables compact visual content representation and efficient matching, equates to 4×N=~700 KB of memory space without compression.

Accordingly, the candidate split points must follow the same global order in both videos. Therefore, the candidate split points are first sorted according to their original order in time and then aligned using Longest Common Subsequences (LCS) algorithm. The splits points which are not in the LCS output are eliminated from the list of candidates. Since, each split point must appear in both videos, split points that do not are removed from consideration. Additionally, corresponding split points must have approximately the same time duration or frame number (frequency). Accordingly, if the frequency difference between versions is greater than a threshold (e.g., 1-3), then that candidate split points are removed from consideration.

Figure 5:
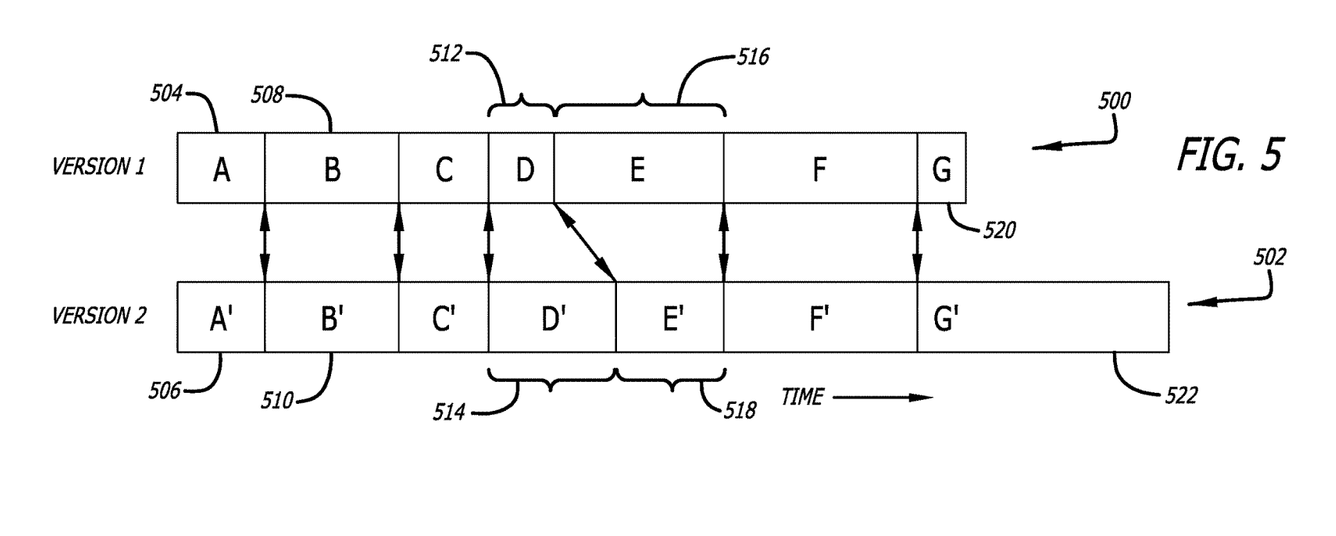
FIG. 5 illustrates another example split point alignment in accordance with at least one embodiment.

Additionally, split points will ideally generate two segments of similar length and, therefore, it is desirable to eliminate them otherwise. FIG. 5 illustrates an example run-length encoded representation of the fingerprints, in accordance with at least one embodiment, showing split point between version 1 500 of a video and version 2 502 of the video that do not have similar lengths. In this example, segment A 504 and segment A' 506 and segment B 508 and segment B' 510 have similar lengths, however, segment D 512 and segment D' 514 and segment E 516 and segment E' 518 do not. Accordingly, since the split points for these segments bound segments of similar length between versions (500, 502), these split points are eliminated from the set of candidate split points. In this example, although segment G 520 does not have a similar length compared to segment G' 522, segment G 520 could represent the end credits which were added to resulting in the added length of segment G' 522.

Figure 6:
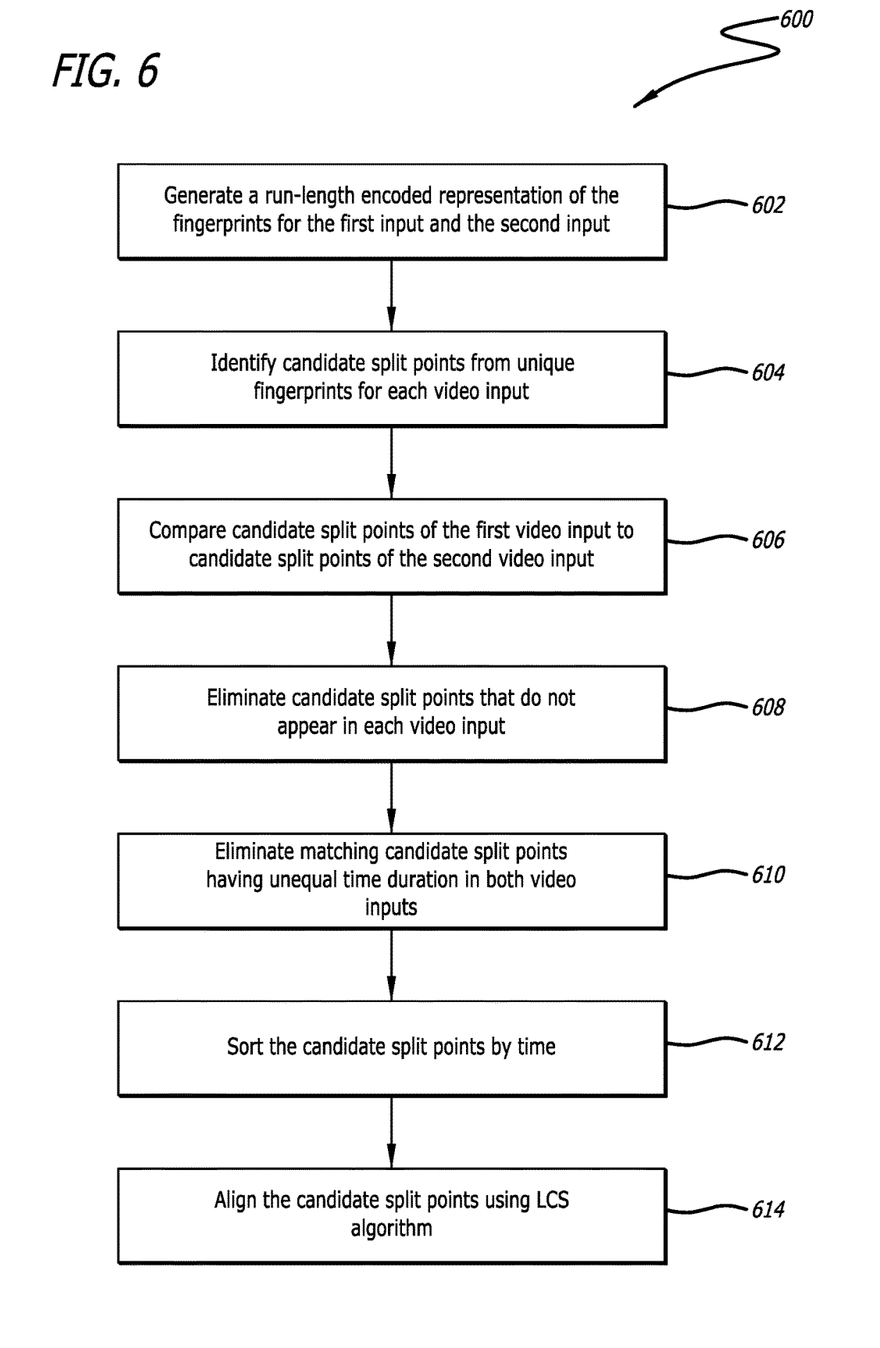
FIG. 6 illustrates an example process for aligning different versions of a video by split points in accordance with at least one embodiment.

Accordingly, FIG. 6 illustrates an example process 600 for aligning different versions of a video by split points in accordance with at least one embodiment. In this example, a run-length encoded representation of the fingerprints is generated for the first input and the second input 602. The candidate split points from unique fingerprints for each video input are identified 604. Accordingly, once the candidate split points are identified for both versions, they are forwarded to a split point selection stage where multiple heuristic filters are applied on the candidate split points to ensure their suitability. For example, the candidate split points of the first video input are compared to candidate split points of the second video input 606. Accordingly, the candidate split points that do not appear in each video input are eliminated 608. Matching candidate split points having unequal time duration in both video inputs are also eliminated at this stage 610. The candidate split points are sorted by time 612 and aligned using LCS algorithm 614. Accordingly, candidate split points must follow the same global order in both videos. Therefore, the candidate split points are first sorted according to their original order in time.

Figure 7:
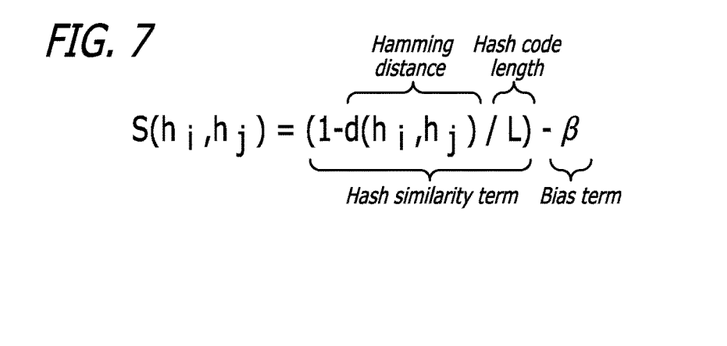
FIG. 7 illustrates an example fingerprint similarity function that can be used in accordance with various embodiments.

After applying these heuristic filters and eliminating unsuitable split points, hundreds or thousands of suitable split points are typically identified, depending on the length of the video sequence. Accordingly, each video input is split into shorter corresponding pieces using these selected split points and forwarded to the next stage where the sequence segments are pairwise aligned at the frame level using a more complex dynamic programming algorithm. For example, each segment pair between versions is aligned using Gotoh's sequence alignment algorithm. Gotoh's algorithm promotes alignment and penalizes inserting gaps (where one or more frames are added to one version) in the alignment. For example, opening a gap can cost (0<d=0.10<1) and extending a gap can cost (0<e=0.02<1). Gotoh's sequence alignment algorithm and fingerprint similarity function, shown in FIG. 7, can align a segment from the first version to a corresponding segment from the version down to the granularity of a single frame. In this example, S is the similarity function between two fingerprints, d is the Hamming distance or the minimum number of substitutions required to move one frame to its location in the other version, L is the hash code length which, in this example, is 32, and the Bias term, in one example, is 0.8. Accordingly, once all segments are frame level aligned, all the segments can be concatenated to generate a final global alignment.

Figure 8:
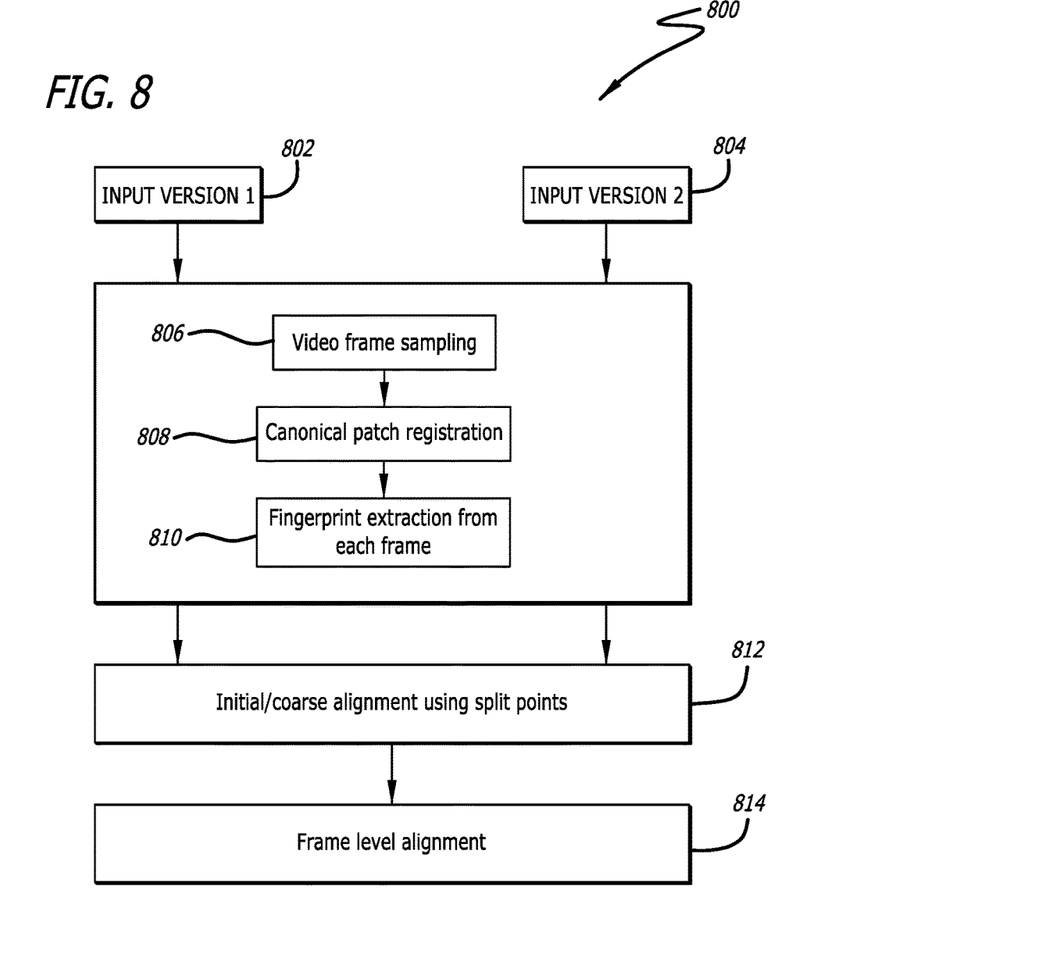
FIG. 8 illustrates an example process for aligning different versions of a video in accordance with at least one embodiment.

FIG. 8 illustrates an example process 800 for aligning different versions of a video in accordance with at least one embodiment. In this example, first input 802 (version 1) and second input 804 (version 2) are sampled 806 at, for example, 24 frames per sec and then processed to extract fingerprints (or a visual signature) therefrom. In order to extract a fingerprint from a single frame, the frame into a plurality of cells. The effective sampling rate for the videos is automatically determined for each input video pair. Specifically, the effective sampling rate is the minimum of the two input video frame rates and a maximum frame sampling frequency parameter. Most video sequences have 24 or higher frame rates. However, it is not necessary to use higher frame sampling rates than 24 in practice. If a video has a frame rate of 12 and the second video has 24, then the alignment must be carried out at this lower frame sampling rate. The cell segmentation process can be referred to as canonical patch registration 808, where a canonical patch, divided into multiple cells, is placed about the center of the frame. Accordingly, in order to extract the fingerprints from the frame, the average intensity value for each cell is computed and the average intensity value for a first cell is compared against each of a subset of other cell of the plurality of cells to compute the fingerprint 810. The canonical patch, in one example, has 30 cells in total and a "canonical" set of n pairs of cells (n=30) are chosen to compute each bit of the 32-bit fingerprint and this canonical set is kept constant for aligning any pair of videos. In this example, the other 2 bits of the fingerprint is used for encoding information, such as whether a respective frame has uniform color intensity, or the like.

After a finger print has been generated for each frame of first input 802 (version 1) and a second input 804 (version 2), the fingerprints undergo an initial coarse alignment 812 that includes various filters to identify suitable split points common to both versions. Accordingly, a run-length encoded representation of fingerprints for first input 802 (version 1) and a second input 804 (version 2) is generated. From each of these run-length encoded representations, unique fingerprints are identified. The split points are determined from these unique fingerprints, but first the unique fingerprints from each version are compared to each other and unique fingerprints that appear in both versions are kept as candidate split points. Accordingly, these matching unique fingerprints are sorted and filtered using a Longest Common Subsequences (LCS) algorithm to determine the set of split points that will be used to segment each version. Thus, each version is segmented at locations corresponding to each of these split points.

Once the video has been broken down into smaller, more computationally manageable segments, each individual segment between the two versions can be aligned at the frame level 814 by individually matching frames from first input 802 (version 1) to the frames of second input 804 (version 2) using a dynamic programming algorithm, such as Gotoh's sequence alignment algorithm. Accordingly, once each individual segment has been frame level aligned, a global alignment output for these two version is generated by concatenating the segments for each version based at least in part on their relative alignment between each other. Accordingly, the global alignment output can provide a frame level detailed alignment between the two versions of the video that can be used to detect copyright violations, identify repeated scenes (e.g., introductions, end-credits, etc.), determine whether two videos are duplicates, generally determine the differences across different versions, and the like.

Additionally, in order to enable a user to access information (e.g., actor or scene information, etc.) while they are currently viewing a film, as discussed above, each scene where this information is available must be annotated with an instruction that, when selected, causes the information to be displayed. As mentioned above, this requires the individual marking, labeling, or addition comments to each frame. Previously, annotations could only be automatically propagated to other versions of the same movie if the other versions have identical content and total duration. Thus, someone would have to individually manually enter the annotations for each version containing additions, such a new scenes, an additional trailer or FBI warning, or the like. Since the global alignment is capable of providing frame level alignment details between different version, however, corresponding frames from a first version to a second version can be identified whether they are a single frame apart or 10,000 frames apart, for example. Thus, upon obtaining a set of annotations for a set of frames of a first version of a video, their corresponding frames in a second version of the video can be identified, and the annotations can be automatically propagated to only those correctly matching frames.

Figure 9:
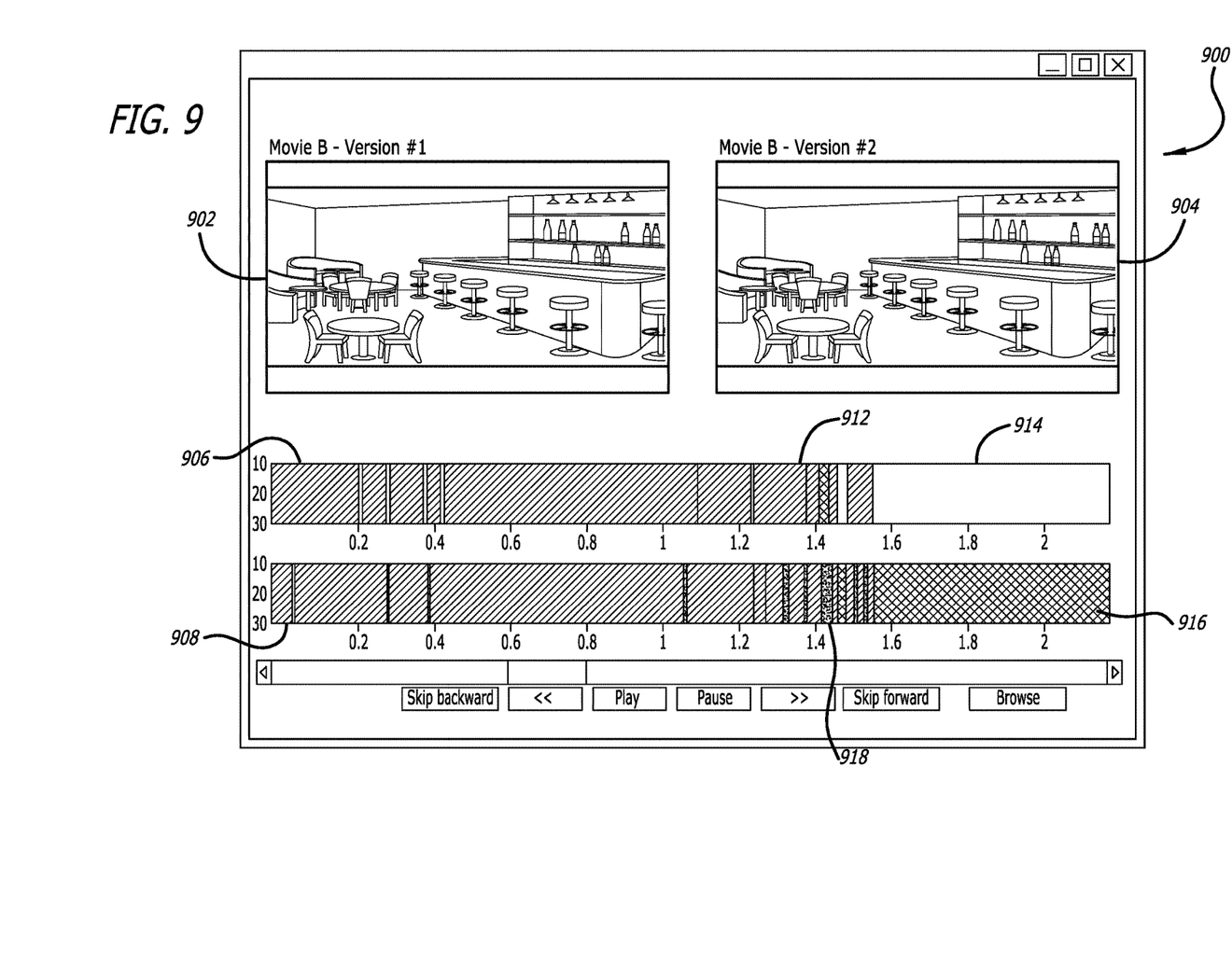
FIG. 9 illustrates an example video alignment visualization for two different versions of a video in accordance with at least one embodiment.

FIG. 9 illustrates example video alignment visualization 900 for two different versions of Movie B in accordance with at least one embodiment. In this example, first version 902 and second version 904 of Movie B are being compared and first output 906 and second output 908 represent the global alignment output comparing these two different versions. The pattern corresponding to segment 912 represents the portions between the two versions that are the same. The crosshatched pattern corresponding to segment 916 represents one or more scenes that were added. For example, segment 916 is new to second version 904, it did not appear in first version 902, as denoted by segment 914 that has no pattern. Additionally, segment 918 represented by the stipple shading, corresponds to a deleted scene that appeared in first version 902 (shown in cross hatch pattern in first output 902), but does not appear in second version 904. Additionally, there are other added and deleted scenes between first output 906 and second output 908 representing some fine changes between the two versions.

Figure 10:
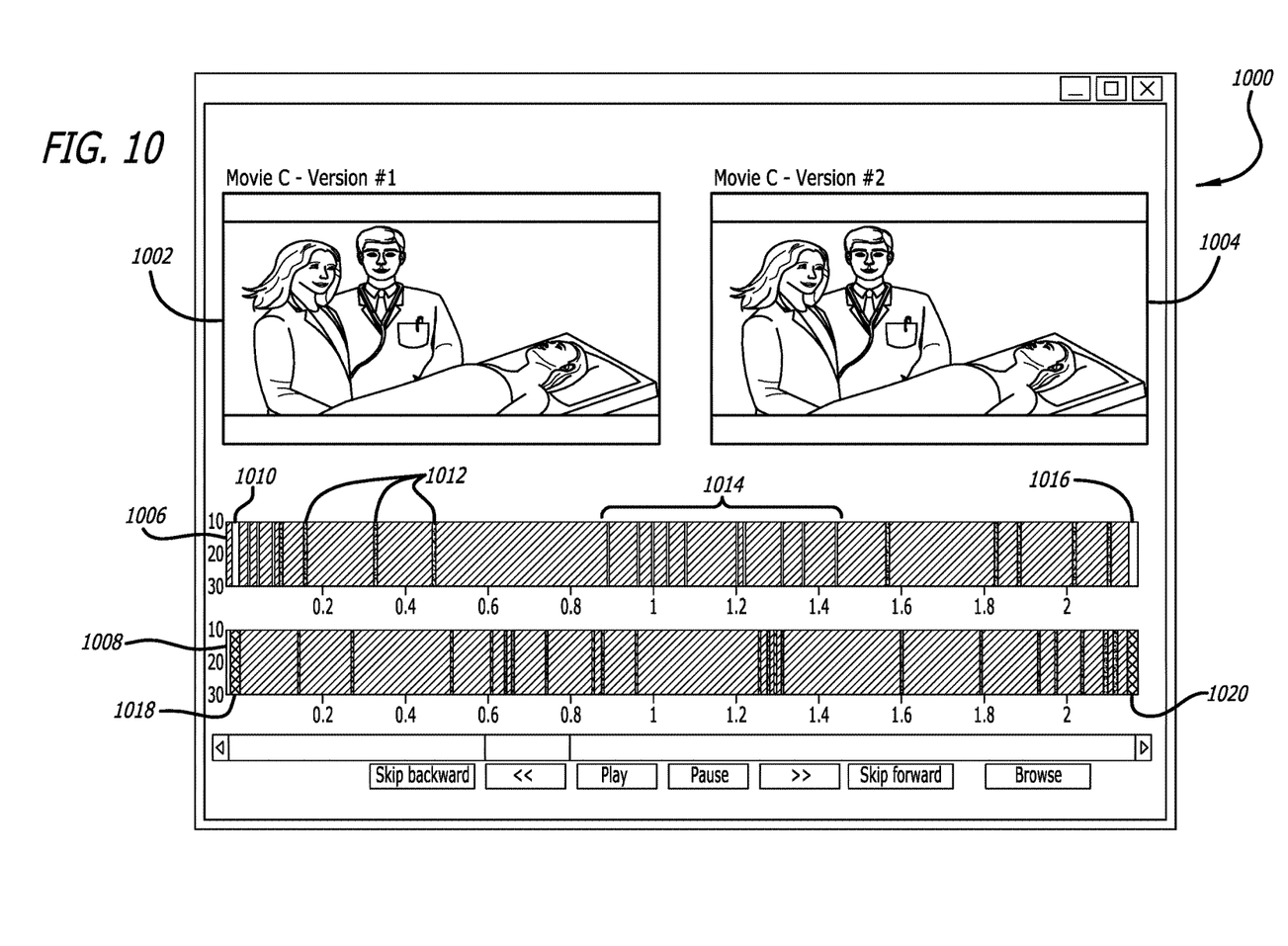
FIG. 10 illustrates another example video alignment visualization for two different versions of a video in accordance with at least one embodiment.

FIG. 10 illustrates example video alignment visualization 1000 in accordance with at least one embodiment. In this example, first version 1002 and second version 1004 of Movie C are being compared and first output 1006 and second output 1008 represent the global alignment output comparing these two different versions. The pattern corresponding to segment 1010 represents a portion that did not appear in first version 1002, but did in second version 1008 where it is represented by segment 1018 in a crosshatched pattern. Similarly, segment 1016 did not appear in first version 1002, but was added in second version 1008 where it is represented by segment 1020 in a crosshatched pattern. There are also added and deleted scenes between first output 1106 and second output 1108 represented by segments 1012 and 1014.

Figure 11:
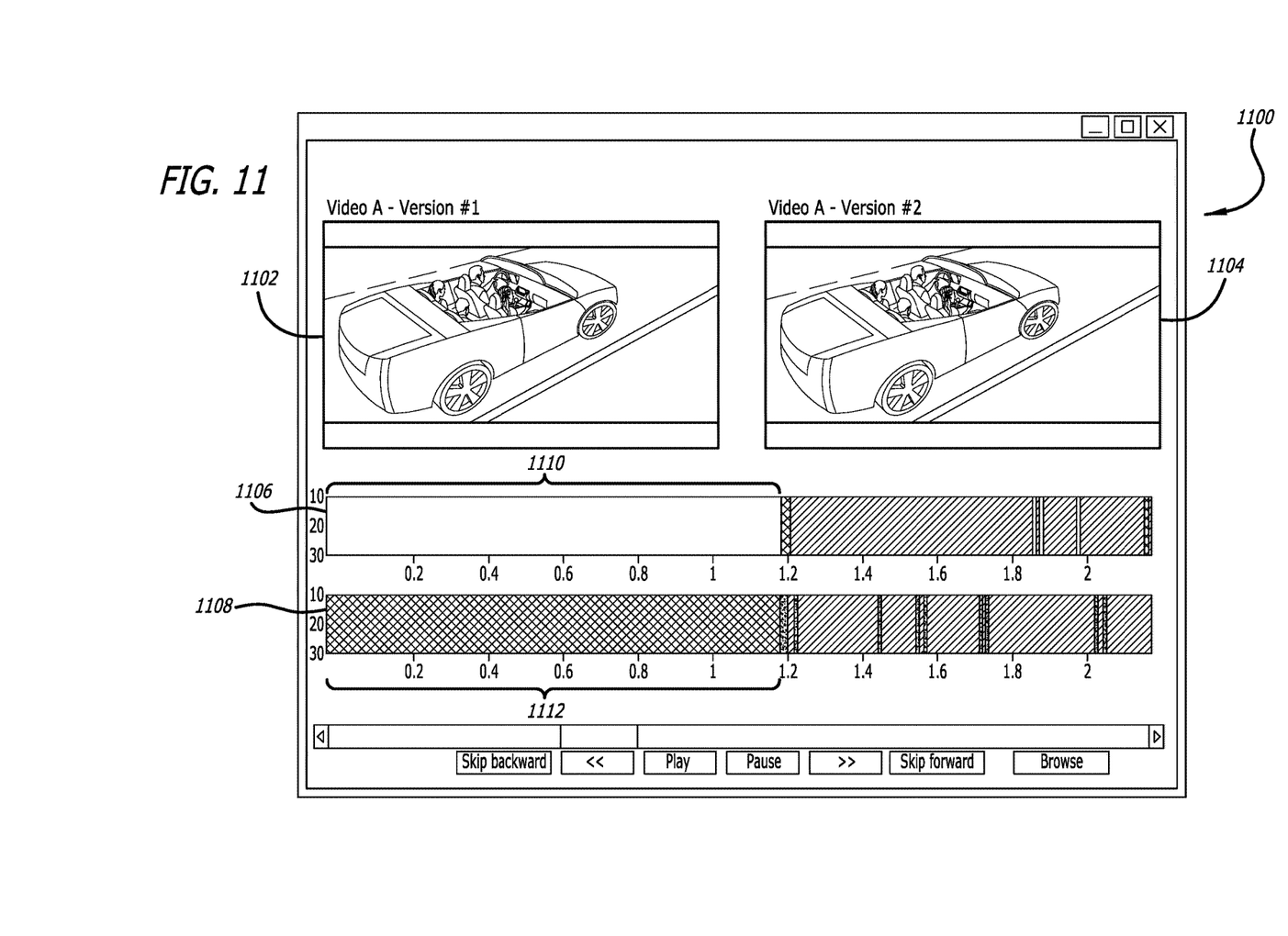
FIG. 11 illustrates another example video alignment visualization for two different versions of a video in accordance with at least one embodiment.

FIG. 11 illustrates example video alignment visualization 1100 in accordance with at least one embodiment. In this example, first version 1102 and second version 1104 of Video A are being compared and first output 1106 and second output 1108 represent the global alignment output comparing these two different versions. In this example, there are added and deleted scenes between first output 1106 and second output 1108 representing some fine changes between the two versions, as similarly described above. However, this example represents a situation where two episodes of a television show were added together in second version 1104. For example, referring to first output 1106, segment 1110 is long and contains no pattern, meaning that it was added in second version 1104. Accordingly, the corresponding segment 1112 to segment 1110 is provided in the crosshatch pattern indicating that it has in fact been added to second version 1104 of Video A.

Figure 12:
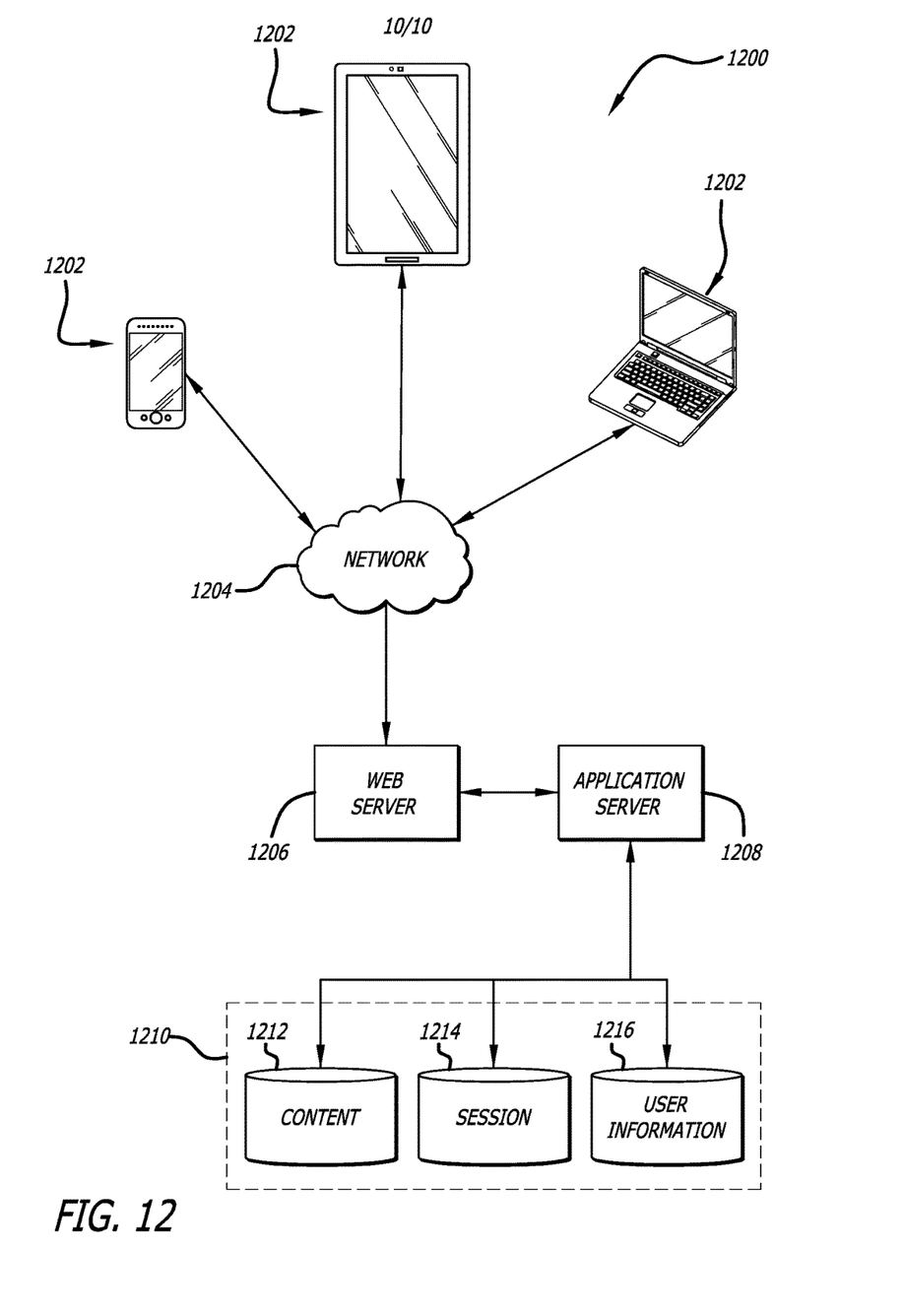
FIG. 12 illustrates an environment in which various embodiments can be implemented.

Different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks, an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1208 can include any appropriate hardware and software for integrating with the data store 1210 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1206 in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing content (e.g., production data) 1212 and user information 1216, which can be used to serve content for the production side. The data store is also shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising: receiving a first video file and a second video file, the first video file including a first plurality of frames and the second video file including a second plurality of frames, each frame of the first plurality of frames segmented into one or more cells, each frame of the second plurality of frames segmented into one or more cells; generating a first fingerprint for each frame of a first subset of frames of the first plurality of frames based at least in part on an intensity value associated with the one or more cells of each frame of the first subset of frames; generating a second fingerprint for each frame of a second subset of frames of the second plurality of frames based at least in part on an intensity value associated with the one or more cells of each frame of the second subset of frames; generating a first encoded representation of the first fingerprints for the first subset of frames and a second encoded representation of the second fingerprints for the second subset of frames; identifying a first set of unique fingerprints from the first encoded representation and a second set of unique fingerprints from the second encoded representation; comparing the first set of unique fingerprints to the second set of unique fingerprints; segmenting the first video file into a plurality of first segments and the second video file into a plurality of second segments based at least in part on comparing the first set of unique fingerprints to the second set of unique fingerprints; and aligning each first segment of the plurality of first segments with a corresponding second segment of the plurality of second segments; determining a set of split points, the split points being used to match unique fingerprints between the first video file and the second video file based at least in part on comparing the first set of unique fingerprints to the second set of unique fingerprints; sorting, by video file, the set of split points; aligning, using a dynamic programming algorithm, first split points of the set of split points from the first video file with second split points of the set of split points from the second video file; and removing split points of the set of split points that do not appear in an output generated by the dynamic programming algorithm.

2. The computer-implemented method of claim 1, wherein generating the first fingerprint for each frame includes:
computing the intensity value associated with the one or more cells of each of the first subset of frames, the intensity value being an average intensity value of each cell; and
comparing the intensity value of a first cell against each of a subset of the other cells to generate the first fingerprint.

3. The computer-implemented method of claim 1, wherein generating the second fingerprint for each frame includes:
computing the intensity value associated with the one or more cells of each of the second subset of frames, the intensity value being an average intensity value of each cell; and
comparing the intensity value of a second cell against each of a subset of the other cells to generate the second fingerprint.

4. The computer-implemented method of claim 1, wherein the dynamic programming algorithm is a Gotoh's sequence alignment algorithm.

5. The computer-implemented method of claim 1, further comprising: comparing a first time duration of a split point from the first video file to a second time duration of a corresponding split point of the second video file; determining that the first time duration of the split point from the first video file does not match the second time duration of the split point from the second video file; and removing the split point from the first video file and the split point from the second video file from the set of split points.

6. The computer-implemented method of claim 1, wherein each split point of the set of split points corresponds to a sequence of frames of a particular scene in the video file.

7. The computer-implemented method of claim 1, wherein determining the set of split points further comprises: identifying a plurality of matching unique fingerprints based at least on comparing the first set of unique fingerprints to the second set of unique fingerprints; sorting the plurality of matching unique fingerprints by time; and filtering the plurality of matching unique fingerprints using a Longest Common Subsequences (LCS) algorithm; and determining the set of split points based on the filtering.

8. The computer-implemented method of claim 1, further comprising:
obtaining frame annotations for a set of frames from the first video file; and
propagating the frame annotations to a set of corresponding frames in the second video file based on aligning each first segment of the plurality of first segments with corresponding second segment of the plurality of second segments.

9. The computer-implemented method of claim 1, wherein aligning each first segment of the plurality of first segments with corresponding second segment of the plurality of second segments includes:
inserting at least one frame gap in a location of the first video file corresponding to at least one inserted frame in the second video file.

10. A computing system, comprising: a processor; and memory including instructions that, when executed by the processor, cause the computing system to: receive a first video file and a second video file, the first video file including a first plurality of frames and the second video file including a second plurality of frames, each frame of the first plurality of frames segmented into one or more cells, each frame of the second plurality of frames segmented into one or more cells; generate a first fingerprint for each frame of a first subset of frames of the first plurality of frames based at least in part on an intensity value associated with the one or more cells of each frame of the first subset of frames; generate a second fingerprint for each frame of a second subset of frames of the second plurality of frames based at least in part on an intensity value associated with the one or more cells of each frame of the second subset of frames; generate a first encoded representation of the first fingerprints for the first video file input and a second encoded representation of the second fingerprints for the second video file input; identify a first set of unique fingerprints from the first encoded representation and a second set of unique fingerprints from the second encoded representation; compare the first set of unique fingerprints to the second set of unique fingerprints; segment the first video file input into a plurality of first segments and the second video file input into a plurality of second segments based at least in part on comparing the first set of unique fingerprints to the second set of unique fingerprints; and align each first segment of the plurality of first segments with a corresponding second segment of the plurality of second segments, wherein generating the version fingerprint for each frame of the version of the video file further includes: segmenting each frame into a plurality of cells; and positioning a rectangular canonical window divided into the plurality of segments relative to a center of the frame, the frame having a first size and the rectangular canonical window having a second size that is smaller than the first size.

11. The computing system of claim 10, wherein the instructions, when executed by the processor, further enable the computing system to:
identify a plurality of matching unique fingerprints based at least on comparing the first set of unique fingerprints to the second set of unique fingerprints;
sort the plurality of matching unique fingerprints by time; and
filter the plurality of matching unique fingerprints using a Longest Common Subsequences (LCS) algorithm; and
determine a set of split points based on the filtering.

12. The computing system of claim 11, wherein the instructions, when executed by the processor, further enable the computing system to:
sort, by video file input, the set of split points;
align, using the LCS algorithm, first split points of the set of split points from the first video file input with second split points of the set of split points from the second video file input; and
remove split points of the set of split points that do not appear in an LCS output generated by the LCS algorithm.

13. The computing system of claim 11, wherein each split point of the set of split points corresponds to a sequence of frames of a unique scene in the video file.

14. The computing system of claim 10, wherein the instructions, when executed by the processor, further enable the computing system to:
determine, using Gotoh's sequence alignment algorithm, individual frame correspondence between each first segment of the plurality of first segments with a corresponding second segment of the plurality of second segments; and concatenate the plurality of first segments and the plurality of second segments based at least in part on the individual frame correspondences; and generate a global alignment comparison output based on the concatenation.

15. The computing system of claim 10, wherein the instructions, when executed by the processor, further enable the computing system to:

obtain frame annotations for a set of frames from the first video file input; and propagate the frame annotations to a set of corresponding frames in the second video file input based on the individual frame alignment.

16. The computing system of claim 10, wherein generating the first fingerprint for each frame includes:

determining the intensity value associated with the one or more cells of each of the first subset of frames;

pair-wise comparing the intensity value of a first cell against each other first cell of the one or more cells of each of the first subset of frames; and computing the first fingerprint based at least in part upon the pair-wise comparison.

17. The computing system of claim 10, wherein generating the second fingerprint for each frame includes:

determining the intensity value associated with the one or more cells of each of the second subset of frames;

pair-wise comparing the intensity value of a second cell against each other second cell of the one or more cells of each of the second subset of frames; and computing the second fingerprint based at least in part upon the pair-wise comparison.

18. A non-transitory computer-readable storage medium storing instructions that, when executed by a processor, cause a computing device to: for each version of a video file: segment the video file into a plurality of frames, each frame of the plurality of frames segmented into one or more cells; generate a fingerprint for each frame of the version based at least in part on an average intensity value for each cell of the version of the video file; generate a run-length encoded representation of each version's fingerprints for the version of the video file; identify a set of unique fingerprints of each version from the run-length encoded representation; determine a set of split points for the version of the video file based at least in part upon a plurality of matching unique fingerprints between each set of unique fingerprints for each version; and segment the version of the video file into a plurality of version segments using the set of split points; determine individual frame correspondences between each version segment of the plurality of version segments and a corresponding version segment of a plurality of corresponding version segments; and concatenate the plurality of the version segments and the plurality of corresponding version segments based at least in part on the individual frame correspondences, wherein generating the version fingerprint for each frame of the version of the video file further includes: segmenting each frame into a plurality of cells; and positioning a rectangular canonical window divided into the plurality of segments relative to a center of the frame, the frame having a first size and the rectangular canonical window having a second size that is smaller than the first size.

\* \* \* \* \*